J. MILLER.
VEHICLE TOP.
APPLICATION FILED JAN. 22, 1919.
1,322,326.
Patented Nov. 18, 1919.
2 SHEETS—SHEET 1.
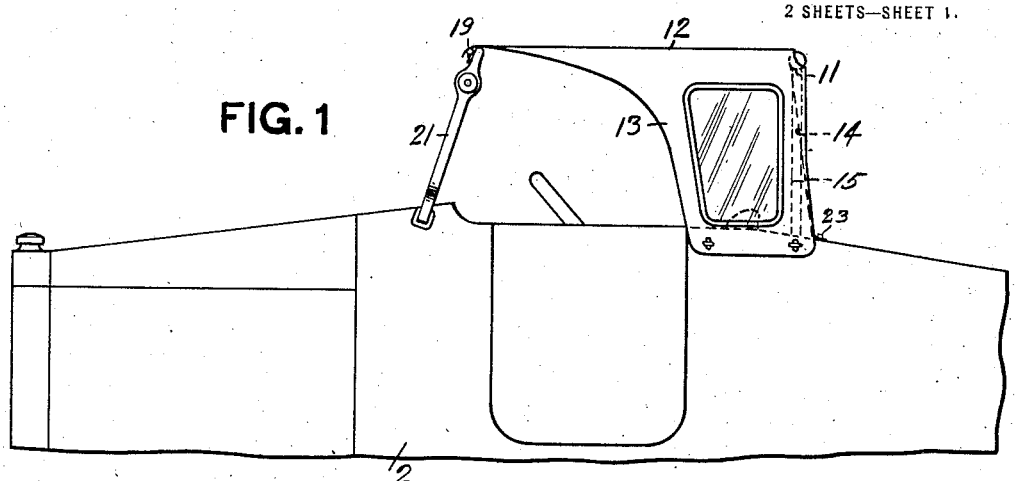
FIG. 1
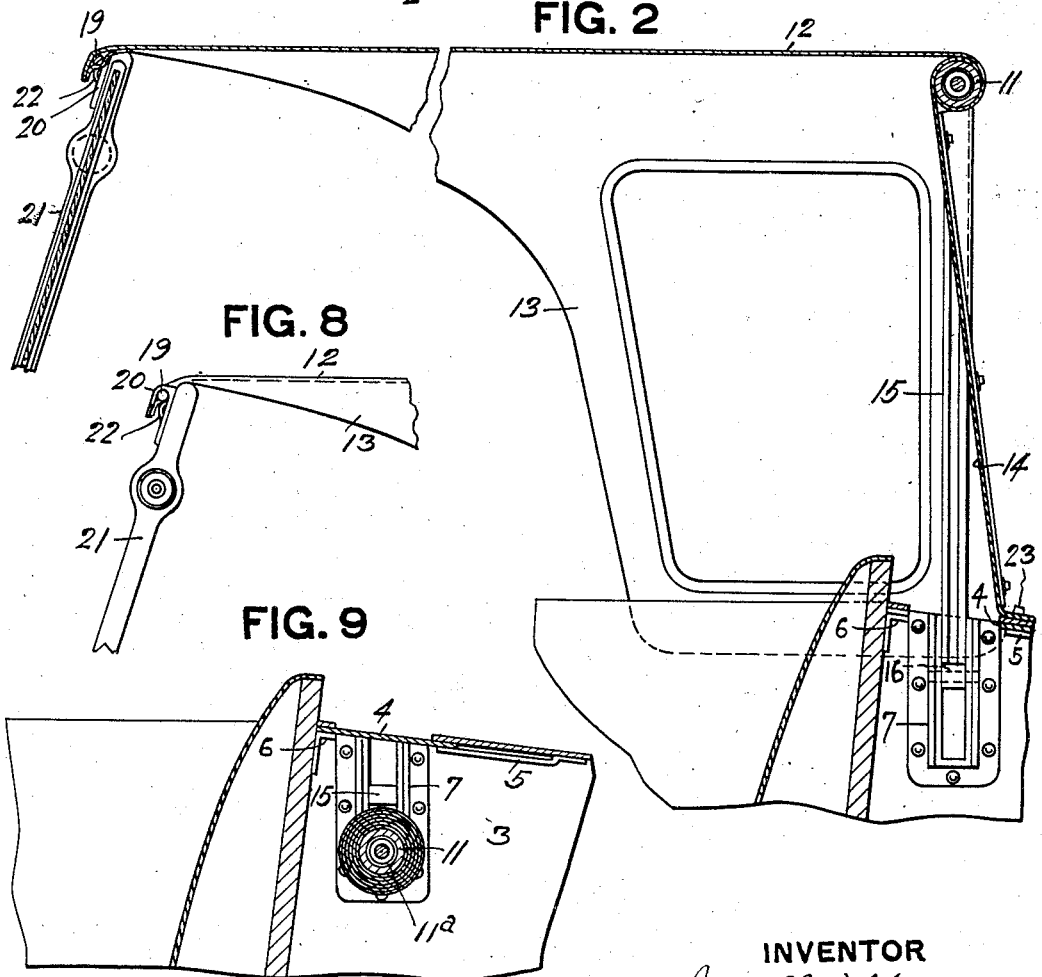
FIG. 2
FIG. 8
FIG. 9
INVENTOR
Joe Miller J. MILLER.
VEHICLE TOP.
APPLICATION FILED JAN. 22, 1919.
1,322,326.
Patented Nov. 18, 1919.
2 SHEETS—SHEET 2.
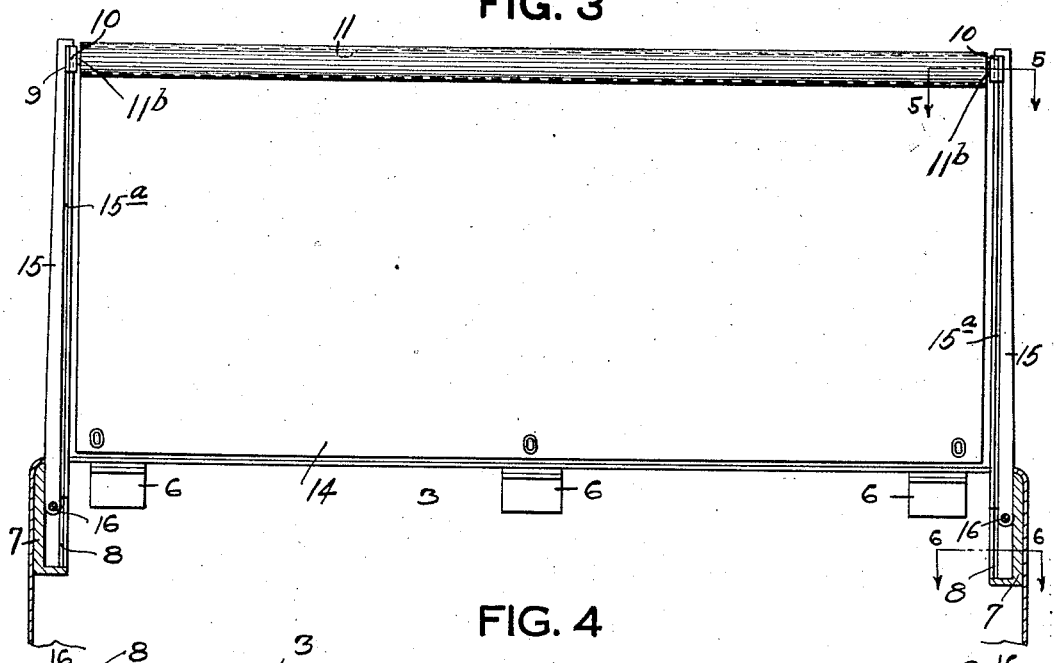
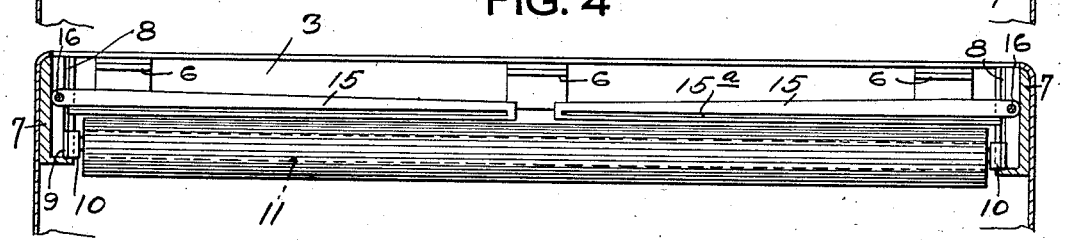
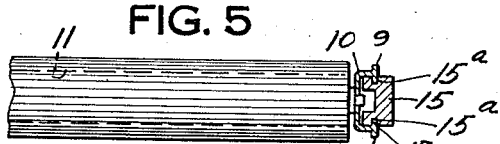
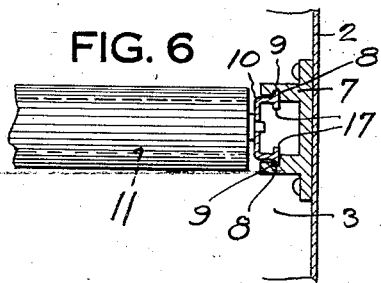
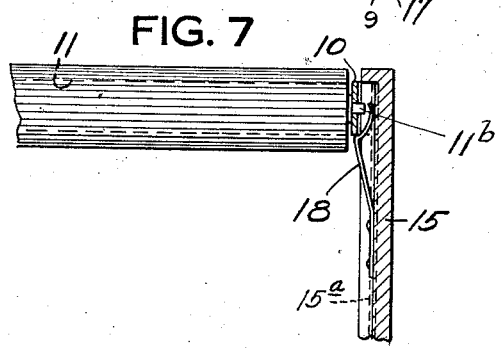
INVENTOR

UNITED STATES PATENT OFFICE.

JOE MILLER, OF PITTSBURGH, PENNSYLVANIA.

VEHICLE-TOP.

1,322,326.

Specification of Letters Patent.

Patented Nov. 18, 1919.

Application filed January 22, 1919. Serial No. 272,510.

To all whom it may concern:

Be it known that I, JOE MILLER, a citizen of the United States, and resident of Pittsburgh, in the county of Allegheny and State of Pennsylvania, have invented a new and useful Improvement in Vehicle-Tops; and I do hereby declare the following to be a full, clear, and exact description thereof.

My invention relates to vehicle tops for use in connection with automobiles.

The object of my invention is to provide a disappearing top which is simple in construction and when not in use is tucked away in the body of the car so as not to be visible, in no way interfering with the lines of the car nor requiring any material change in the structure of the car.

To these ends my invention comprises the novel features hereinafter set forth and claimed.

In the drawings Figure 1 is a view of a portion of an automobile body showing my improved top in position for use; Fig. 2 is an enlarged longitudinal section of the top and portions of the car; Fig. 3 is an enlarged rear view partly in section; Fig. 4 is a plan view partly in section showing the top in its compartment; Fig. 5 is an enlarged section on the line 5—5 Fig. 3; Fig. 6 is an enlarged section on the line 6—6 Fig. 3; Fig. 7 is an enlarged vertical section of a portion of one of the standards with the roller in position at the upper end thereof; Fig. 8 is a view showing the manner of connecting the top to the windshield supports, and Fig. 9 is a view partly in section of the body of the car showing the top rolled up in its compartment.

In the drawings the numeral 2 designates the body of a common type of roadster. In the rear of the seat is the top compartment 3 which is closed by the sliding cover 4 working in the guides 5 and 6.

Secured to the ends of the compartment 3 are the guides 7 having the vertical guide-grooves 8 formed therein adapted to receive the outwardly extending flanges 9 of the slides 10. These slides carry the roller 11 which is of the ordinary spring roller type for shades having the spring 11ª, and the trunnions 11ᵇ; one of the trunnions being round and rotatable with the roller, and the other rectangular in cross-section and connected to the spring of the roller, said trunnions fitting in correspondingly shaped openings in the slides 10.

Secured to the roller 11 is the top 12 formed of leather or other suitable material and connected to said top are the side curtains 13 adapted to fold under the top when the top is rolled up on the roller 11. The back curtain 14 is also secured to the roller 11. The top, side and back curtains when rolled up form a tight compact roll as shown in Fig. 9, and said roll fits down within the compartment 3.

The standards 15 are pivotally secured by the pins 16 at their lower ends to the body in the compartment 3 and when not in use these standards are folded down in the horizontal position shown in Fig. 4 within the compartment 3. These standards 15 have the vertical guide-grooves 15ª formed therein adapted to receive the inwardly extending flanges 17 of the curtain-slides 10. The guide-grooves 8 of the guides 7 and the the guide-grooves 16 of the standards 15 coincide for the purpose more fully hereinafter set forth.

At the upper ends of the standards 15 are the springs 18 in the path of the slides 10, said springs acting to support the slides in their elevated positions as shown in Fig. 7.

At the forward end of the top 12 is the rod 19, and the outer ends of said rod are adapted to engage the hooks 20 on the side bars 21 of the windshield frame. A spring 22 is adapted to hold said rod in engagement with said hooks to prevent accidental displacement of same.

When it is desired to employ my improved top the sliding cover 4 is moved back into the guide 5, and the standards 15 are raised into the position shown in Fig. 3 whereupon the roller 11 is moved upwardly with the flanges 9 of the slides 10 moving in the guide-grooves 8 in the guides 7. Due to the fact that the guide-grooves 16 in the standards 15 coincide with the grooves 8 in the guides 7 the flanges 17 of the slides will engage the guide-grooves 16 of the standards 15 before the flanges 9 disengage from the grooves 8 of the guides 7. In this way I provide for accurate guiding of the flanges 17 into engagement with the grooves 16 of the standards 15. The roller 11 is then moved up in the standards 15 until the slides 10 pass beyond the springs 18 whereupon said springs will act to support the roller in its raised position. The top 12 is then unrolled and its front end secured to the hooks 20 of the windshield frame, the spring of the roller 11 tending to hold the top taut and prevent its sagging. The side-curtains 13 are then lowered and securely buttoned to the side of the car and the back-curtain 14 is then secured at its lower end by the fastening devices 23 in the rear of the compartment 3, so that in case of rain said back curtain will keep the water from the compartment 3.

By my invention I provide a very simple and efficient form of disappearing top which can be snugly stowed away in the compartment provided for it in the body of the car, without in any way interfering with the lines of the car or requiring any material reconstruction of same.

What I claim is:

1. The combination with the body of the vehicle having a compartment formed therein, collapsible standards pivotally connected to the body and adapted to fold in the compartment, a horizontally disposed roller adapted to have sliding end engagement with said standards to form a support spanning the standards to brace them, spread apart in an erect position against pivotal movement, and a top carried by said roller.

2. The combination with the body of the vehicle having a compartment formed therein, a standard pivotally mounted in the compartment at each end thereof and adapted to fold therein, a roller movable vertically into and out of the compartment between said standards and having end engagement therewith for bracing the standards in erect postion, a top carried by said roller, and means for locking the roller to the standards in raised position.

3. The combination with the body of the vehicle having a compartment formed therein, a standard pivotally mounted in the compartment at each end thereof and adapted to fold therein, a roller movable into and out of the compartment between said standards, said roller having end guide members for sliding engagement with the standards, a seat for the roller in the compartment comprising supports engaging said guide members for alining the roller beneath said standards in sliding position therewith, and a top carried by said roller.

4. The combination with the body of the vehicle having a compartment therein, collapsible standards pivotally mounted in said compartment and adapted to fold therein and having grooves formed therein, a roller, sliding members at each end of said roller having flanges adapted to engage said grooves formed in said standards, a top carried by said roller, and means for supporting said roller at the upper end of said standards when raised.

5. The combination with the body of the vehicle having a compartment therein, standards pivotally mounted in said compartment and adapted to fold therein, guide grooves in said standards, guides in said compartment having guide-grooves coinciding with said first grooves, a roller, a top carried by said roller, members on the ends of said roller having flanges for slidably engaging with the grooves of said guides and said standards, and means for supporting said roller at the upper ends of said standards.

6. The combination with the body of the vehicle having a compartment therein, standards pivotally mounted in said compartment and adapted to fold therein, a spring actuated roller slidable on said standards, a top carried by said spring roller, and means on the ends of said roller for guiding and supporting said roller in said standards when said standards are raised.

7. The combination with the body of the vehicle having a compartment therein, standards pivotally mounted in said compartment and adapted to fold therein, a spring actuated roller slidable on said standards, a top carried by said roller, means on the ends of said roller for guiding and supporting said roller in said standards when said standards are raised, and means for securing the front end of said top to the windshield.

In testimony whereof, I the said JOE MILLER have hereunto set my hand.

JOE MILLER.

Witnesses:
 A. E. CLANCY,
 ROBT. D. TOTTEN.